United States Patent

[11] 3,580,188

| [72] | Inventor | Thomas H. Lutsey<br>Green Bay, Wis. |
|---|---|---|
| [21] | Appl. No. | 860,377 |
| [22] | Filed | Sept. 23, 1969 |
| [45] | Patented | May 25, 1971 |
| [73] | Assignee | Big Drum, Inc.<br>Columbus, Ohio |

[54] APPARATUS FOR PRODUCING FROZEN COATED ICE-CREAM CONES
8 Claims, 10 Drawing Figs.

[52] U.S. Cl. .................................................. 107/1A,
107/8A, 107/54E
[51] Int. Cl. .................................................. A23g 3/24,
F25c 7/04
[50] Field of Search .................................................. 107/1 (A),
1 (B), 1 (D), 8 (A), 8 (C), 8 (E), 19 (B), 54 (E)

[56] References Cited
UNITED STATES PATENTS

| 1,871,089 | 8/1932 | Shafer | 107/1A |
| 1,989,272 | 1/1935 | England et al. | 107/1A |
| 2,245,071 | 6/1941 | Elwell | 107/8AX |
| 2,366,941 | 1/1945 | Taylor | 107/8A |
| 3,181,575 | 5/1965 | Krizka | 107/8AX |

Primary Examiner—Price C. Faw, Jr.
Attorney—Mahoney, Miller and Stebens

ABSTRACT: Apparatus for making frozen edible articles, such as frozen ice cream cones of the type comprising a pastry container or cone having frozen ice cream filling and extending from the mouth end thereof, with a coating of chocolate and nuts on the protruding ice cream. The apparatus includes an endless conveyor which receives the upright cones to be filled with ice cream, and progressively moves the upright cones to a filling station where they are filled with ice cream that extends from the upper mouth end thereof; moves the filled cones through an elongated freezing chamber from which they emerge in inverted position on the conveyor fully frozen; moves the filled cones while inverted to successive stations where they are coated with syrup and edible particles, such as chocolate and nuts or the like; and finally discharges the frozen inverted coated cones at a wrapping station.

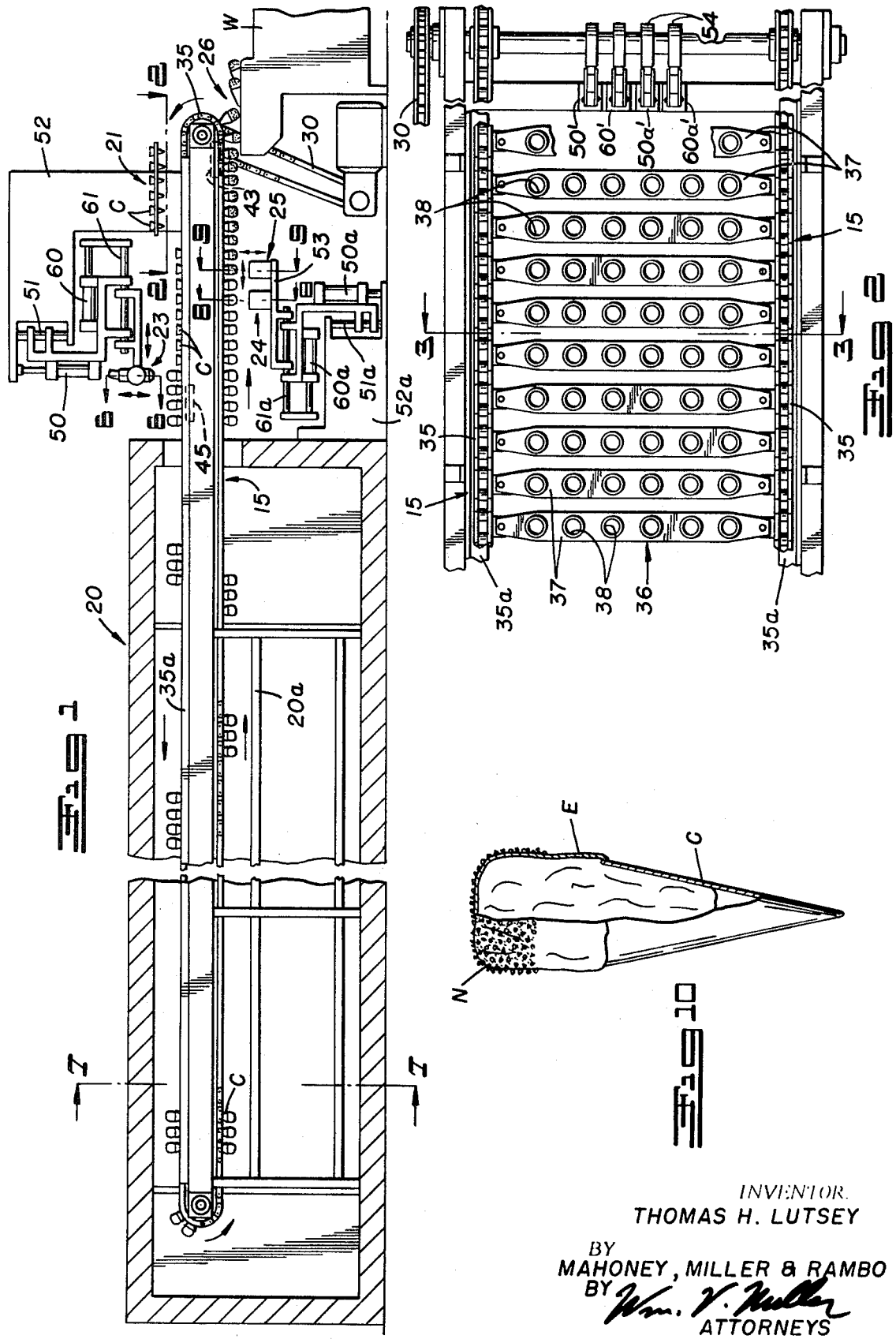

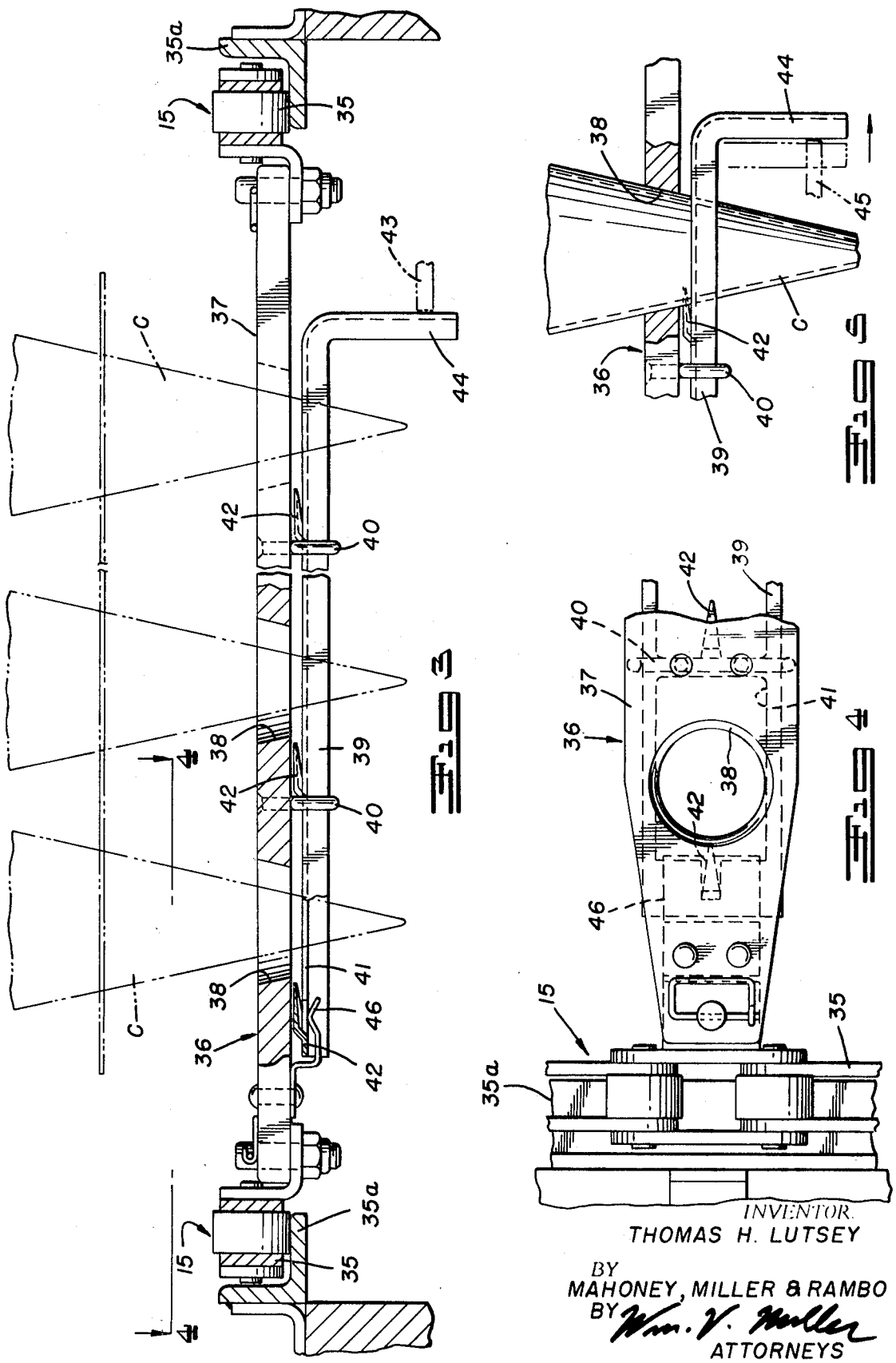

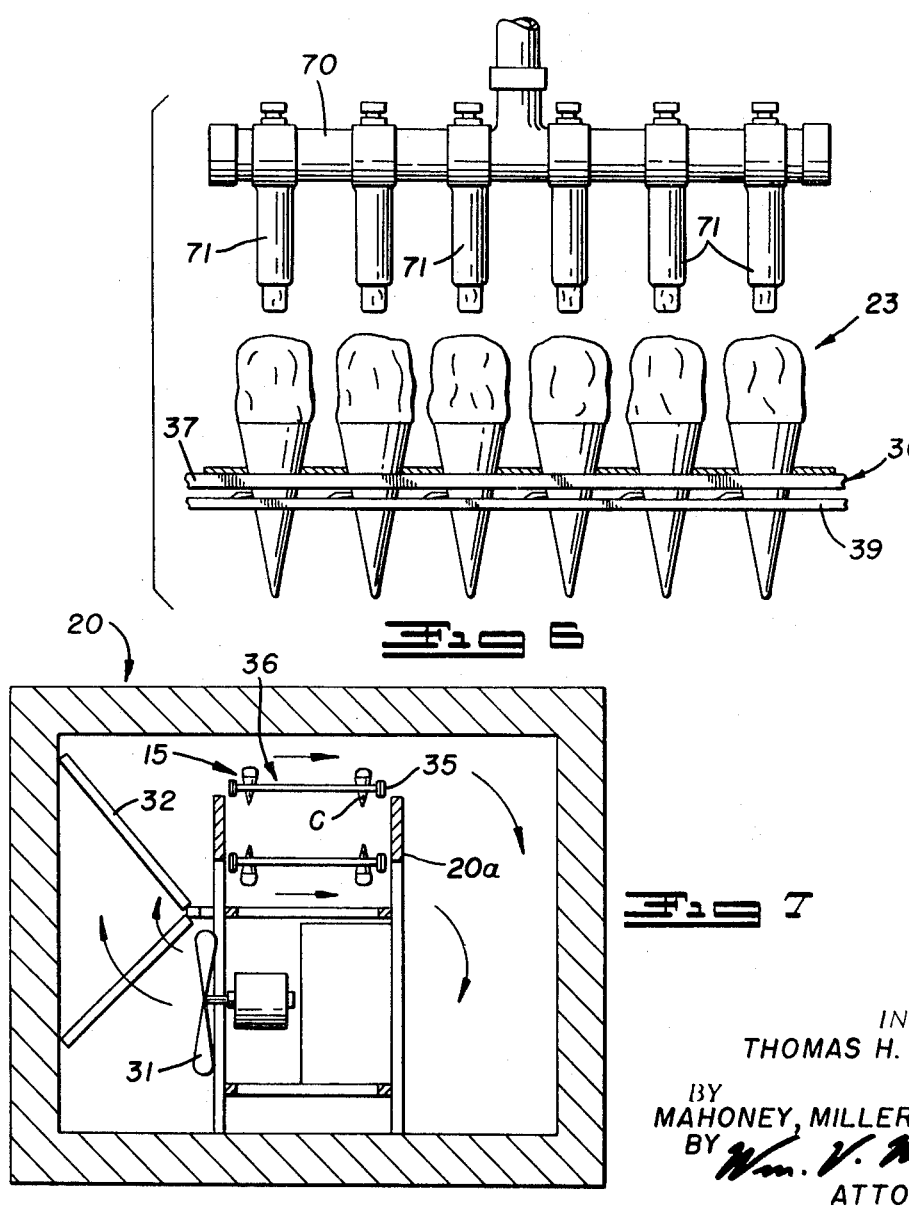

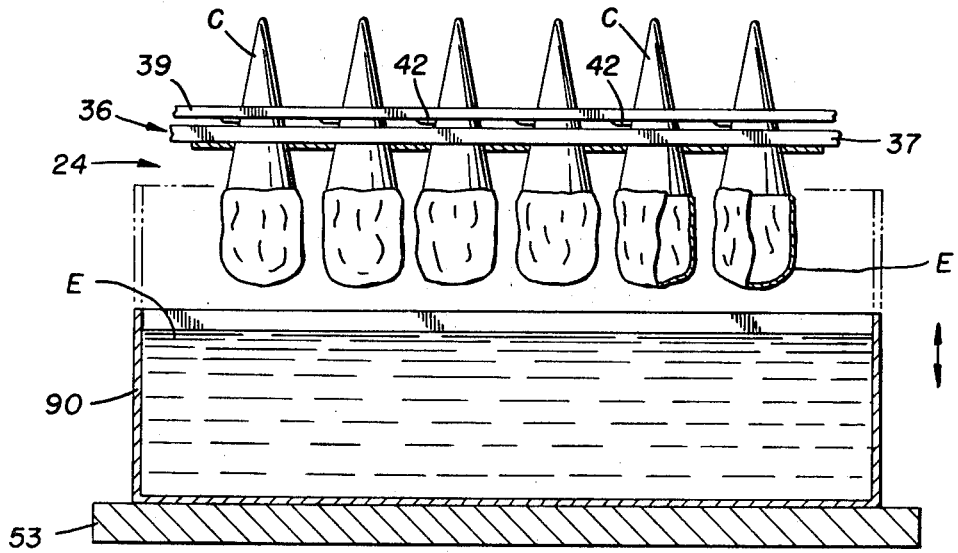
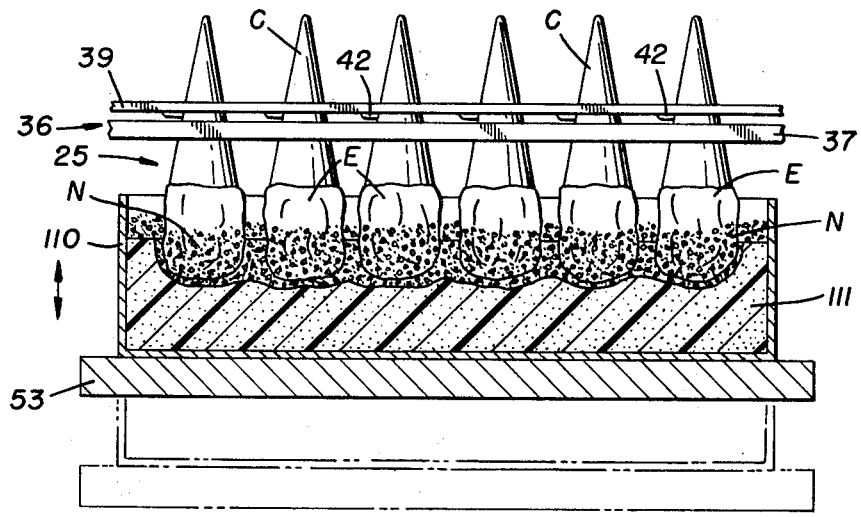
INVENTOR.
THOMAS H. LUTSEY
BY
MAHONEY, MILLER & RAMBO
BY Wm. V. Miller
ATTORNEYS

APPARATUS FOR PRODUCING FROZEN COATED ICE-CREAM CONES

BACKGROUND OF THE INVENTION

It is the usual practice to produce frozen coated cones of the type indicated above by ineffective hand operations. With this proper art hand method, the pastry cones are first filled by hand and placed in a freezing room for a desired period. Then they are held by hand and inverted and dipped into a trough of the liquid chocolate. Next, they are hand-dipped in a tray containing loose nuts and are ready for packaging. This hand method and procedure is not only time consuming and costly, but also results in a nonuniform and less sanitary product. The present invention eliminates these disadvantages by providing an efficient sanitary machine capable of high production at low cost and resulting in a uniform attractive product.

In the accompanying drawings, there is illustrated apparatus according to this invention.

In these drawings:

FIG. 1 is a schematic view in longitudinal section and side elevation illustrating the apparatus.

FIG. 2 is an enlarged detail in plan of the cone gripping units of the conveyor, taken from the position indicated at line 2—2 of FIG. 1.

FIG. 3 is an enlarged transverse vertical sectional view taken along line 3—3 of FIG. 2, showing a cone gripping unit with its parts in cone-loading or cone-releasing condition.

FIG. 4 is a detail in horizontal sectional taken along line 4—4 of FIG. 3.

FIG. 5 is a view in side elevation and vertical section showing one of the cones gripped in a cone-gripping unit. FIG. 6 is an enlarged transverse vertical sectional view taken along line 6—6 of FIG. 1 showing the filling unit for filling the cones with ice cream.

FIG. 7 is an enlarged transverse vertical sectional view taken along line 7—7 of FIG. 1, showing air circulating and directing means in the freezing chamber.

FIG. 8 is an enlarged transverse vertical sectional view taken along line 8—8 of FIG. 1, showing the unit for applying the syrup coating to the inverted ice cream filled and frozen cones.

FIG. 9 is an enlarged transverse vertical sectional view taken along line 9—9 of FIG. 1 showing the unit for applying the edible particles on the inverted syrup-coated ice cream cones.

FIG. 10 is a side elevational view, partly cut away, showing the completed filled and coated cone produced according to this invention.

With reference more specifically to the drawings, the general arrangement of the machine for carrying out this invention is illustrated in FIG. 1 and is shown as comprising an endless conveyor unit 15, which has upper and lower runs that throughout the greater portion of their lengths are disposed in an elongated freezing tunnel or chamber 20, but which extends outside the tunnel at the forward or loading and discharging end as illustrated. At this end of the conveyor along the upper run thereof is the loading station 21 where the containers such as cones C, which are preferably of the sugar-rolled type, are loaded in the conveyor upright, with their mouths opening upwardly, and the confection filling station 23 where the cones are filled with the confection which usually is ice cream, just before they enter the freezing chamber 20. The filled cones are gripped to the conveyor and are carried in the upper run thereof, in an advancing direction, and then inverted, as they are carried by the lower run back through the freezing chamber from which they emerge in frozen condition. On the exposed lower run portion of the conveyor, the inverted filled and frozen cones are carried into cooperation with a syrup coating applying unit 24 which subjects the exposed ice cream to syrup, such as chocolate syrup, and then into cooperation with a unit 25 where the chocolate-coated ice cream is contacted with edible particles such as nuts. Finally, the lower conveyor run passes to a discharge station 26 where the finished frozen cones are released from the conveyor and discharged onto a wrapping machine W of a standard type. The conveyor 15 is driven continuously by a suitable drive 30. Each of the units 23, 24, and 25 is moved with horizontal and vertical components of movement in timed relationship to the continuous movement of the associated run of the conveyor so that each unit acts on the successive cones as they moved along with the conveyor.

The freezing tunnel 20 may be refrigerated by any suitable means to maintain the temperature of the air therein at least as low as −20° F. To effect better heat transfer, the air is circulated in the tunnel by means of fans 31 and is directed transversely of the conveyor by suitable directing means 32 indicated schematically in FIG. 7. The cold air will be directed into association with the filled cones C on both the upper and lower runs of the conveyor 15, while in the freezer tunnel, so that the ice cream will be hard as the cones emerge from the tunnel on the conveyor. The details of the various units for acting successively on the cones C carried by the conveyor are illustrated in FIGS. 6, 8 and 9, and will be described later.

As previously indicated, the conveyor 15 is of the endless type and comprises a pair of endless chains 35 which are disposed for continuous movement in parallel vertical planes extending longitudinally of the machine as shown in FIGS. 1 to 3. The chains include rollers which operate on parallel guides 35a extending at upper and lower levels along a frame 20a which is disposed within the tunnel 20. Between these two chains 35 at longitudinally spaced intervals are carried the transverse flights or cone carrying bar units 36, each of which is adapted to receive a row of the cones C and to grip and release them in timed relationship to the movement of the conveyor. The details of these units are illustrated in FIGS. 2 to 5, inclusive.

Each unit 36 comprises a transverse socket bar 37 having its outer ends fastened to the opposed chains 35. This bar has a plurality of circular sockets 38 for receiving the cones C which are suitably loaded therein in rows at the loading station 21, each socket preferably having a tapering wall and being of a diameter less than the maximum diameter of the cone so that the cone will rest therein by gravity. To grip and hold the cones in the sockets even on the lower run of the conveyor when they are inverted, a gripping bar 39 is mounted for sliding movement beneath each of the socket bars 37. Each of these bars 37 is slideably mounted in guides 40 below the bars 37, for reciprocation relative thereof, and is provided with rectangular openings 41 which are of a length longer than the diameter of the sockets 38 and are disposed below the sockets so that they will extend outwardly beyond the sockets to permit the ends of the cones C to extend downwardly therethrough as indicated in FIGS. 3 and 4. At the corresponding end of each of the openings 41, the left end in FIGS. 3 and 4, the bar 39 carries a cone impaling point 42 which projects inwardly beyond the associated edge of the opening 41. When the units 36 are at the loading station 21, the bars 39 will be in their cone-releasing or cone-loading position by reason of engagement with a release cam 43 positioned in cooperation with the lower run of conveyor 15 just as it reaches the discharge station 26. This release cam 43 (FIG. 3) engages a depending lug portion 44 on the adjacent end of the bar 39. In this position of the bar 39, the impaling points 42 will be retracted to the left outwardly beyond the sockets 38 so as not to engage the cones C therein, as shown in FIG. 3. Thus, at this time, the filled cones can be removed from the sockets 38 and additional empty cones can be loaded into the sockets.

As indicated above, it is necessary to engage and grip the cones C before they are inverted and for this reason an engaging cam 45 is provided in association with the upper run of the conveyor, just beyond the filling station 23, to engage the depending lug 44 on its opposite side, as shown in FIG. 5, so that the bar 39 is moved to the right to cause the impaling points 42 to move inwardly beyond the associated edges of the socket 38 and to pierce the cones C therein. Thus, before the conveyor moves the units 36 around the the lower run thereof, the units are actuated to grip the filled cones before they are inverted so as to prevent dropping from the units. It will be noted that a spring catch 46 is carried by the lower surface of the bar 37 for cooperating with the end of the bar 39 opposite the lug end 44. This spring catch is positioned to engage the end of the bar 39 when it is moved into cone-gripping position by cam 45 and to retain it in that position until it is positively moved over the catch by the release cam 43 (FIG. 3).

As previously indicated, the unit 23 is disposed in cooperation with the upper run of the conveyor 15 just before it enters the freezing tunnel 20. This unit 23 is moved for a selected period at the same linear speed as the advancing movement of the upper run of the conveyor. The purpose of this movement is so that the unit can supply ice cream or similar substance to the successive rows of cones carried by the successive gripper bar units 36. After traveling with the conveyor for a predetermined period, during which vertical movement of the unit also occurs, the unit is returned to its original position. Mechanism for producing this horizontal and vertical movement with the conveyor in synchronism therewith for a predetermined period is illustrated best in FIG. 1 but other suitable units may be employed.

The unit 23 and its associated mechanism is carried for both vertical and horizontal movement on a supporting frame 52 which positions it for proper cooperation with the upper run of the conveyor. The means for supporting it on the frame 52 and for properly moving it in cooperation with the upper run of the conveyor comprises a fluid-actuated cylinder and piston unit 50 producing vertical movement and a fluid-actuated cylinder and piston unit 60 for producing horizontal movement. The unit 50 and associated support bracket is mounted for vertical movement on the frame 52 by a vertical guide 51. The unit 60 is carried for vertical movement with the support bracket of the unit 50 and is provided with a horizontally movable support rod 61 which carries the filling unit 23. Thus, actuation of the units 50 and 60 at proper intervals will produce both vertical and horizontal movement. The supply of fluid to the respective units 50 and 60 will be controlled by suitable valves 50' and 60' (FIG. 2) actuated by cams 54, keyed on the forward transverse shaft of the conveyor 15 and driven continuously by the drive 30.

The unit 23, as previously indicated, is adapted to supply the filling substance to be frozen, such as viscous ice cream, into the cones. It comprises a manifold 70 (FIG. 6) having a plurality of nozzles 71 depending therefrom, these nozzles being equal in number to the sockets 38 in the bar units 36 and being laterally spaced properly so that they can be positioned in axial alignment therewith. The feed of the viscous ice cream from the nozzles is continuous and the row of nozzles will align with a row of the cones C, move downwardly thereinto, gradually withdraw and then retract over the succeeding row of advancing cones, the vertical and horizontal movements being timed with movement of the conveyor, by means of the valves 50' and 60' controlling the units 50 and 60.

After filling as indicated by the unit 23, the cones C are carried through the tunnel 20 where the ice cream is frozen solid. The frozen, filled cones emerge from the tunnel 20 in inverted position and are subjected to the units 24 and 25 which will successively coat the ice cream with chocolate coating and then apply edible particles, such as nuts, to the coating. The units 24 and 25, like the unit 23, are mounted for vertical and horizontal movement relative to the associated run of the conveyor, the lower run, in this instance, so that they will move at the same linear speed as the rows of cones carried thereby and vertically relative thereto. The mechanism for mounting these units for such vertical and horizontal movement is indicated in FIG. 1 and comprises the units 50a and 60a similar to the units 50 and 60 previously described.

The unit 50a and associated support bracket is supported on a vertical guide 51a which is carried forwardly of the tunnel 20 below the lower run of the conveyor 15. The bracket of the unit 50a supports the unit 60a which includes a horizontally slideable support rod 61. This rod 61a supports a platen or platform 53 which carries both the units 24 and 25 in longitudinally spaced relationship. Valves 50a' and 60a' control the supply of fluid to the units 50a and 60a in order to provide the proper vertical and horizontal movement of the platform 53, and the units 24 and 25 carried thereby, in timed relationship to the movement of the lower run of the conveyor. The valves 50a' and 60a' are controlled by cooperating cams 54 which are driven continuously, as previously indicated, in timed relationship to the conveyor.

The chocolate applying unit 24 is illustrated in FIG. 8. It comprises a tank 90, carried by the platform 53, which has its top open and in which the chocolate syrup is maintained at a predetermined level by any suitable supply system (not shown). The tank 90 extends transversely and is sufficiently long that it can be moved upwardly over the associated row of filled and frozen cones C to apply the chocolate coating thereto. As it moves upwardly, the row of cones is completely enclosed within the tank 90 and the ice cream and part of the mouth end of the cones are immersed in the chocolate so that a complete coating of chocolate E encloses the ice cream and extends over a portion of each cone as indicated in FIGS. 8 and 10. As indicated, platform 53 moves vertically and horizontally in timed relationship to movement of the conveyor.

The chocolate-coated rows of the inverted cones C are successively engaged by the unit 25 to apply nuts to the chocolate which will not yet be hardened so that the nuts will effectively adhere thereto. This unit comprises a transverse upwardly opening tray 110 which is also mounted on the platform 53 as indicated. The tray 110 is of sufficient length and width so that its upper end will move upwardly over a row of the dependent chocolate-coated cones C.

The bottom of the tray 110 is a layer 111 of resiliently yieldable cushioning material, such as sponge rubber or plastic. A layer of loose nuts is provided on the upper surface of this cushioning material within the tray. Therefore, when the tray is moved upwardly with the platform 53, the chocolate-coated ice cream presses against the nuts and the nuts are caused to embed in the chocolate coating, adhering thereto as indicated at N in FIGS. 9 and 10. The ice cream will be hard at this time and will not be damaged by pressing the nuts thereagainst because of the cushioning material 111, but the chocolate coating will still be sufficiently soft to cause the nuts to adhere.

It will be apparent from the above description that this invention provides an effective apparatus whereby the empty containers, such as pastry cones, are received and are progressively filled with a confection to be frozen, such as ice cream, subjected to a freezing operation, coated with syrup, such as chocolate, and covered with edible particles, such as nuts. The machine is capable of high production at a low cost and of producing a uniform, sanitary product which has a pleasing and appetizing appearance.

In the above description, the production of coated ice cream cones is described but it is to be understood that this invention is applicable to the production of similar edible products comprising the same general combination of container, filling substance, and coating substance.

Having thus described this invention, what I claim is:

1. Apparatus for producing a frozen edible article including a container, a filling substance in the container extending from the mouth thereof and a coating on the extending filling substance which comprises:

an endless type conveyor mounted for movement in a vertical plane and having upper and lower runs;

a freezing tunnel in which an extended portion of the container is disposed with a portion of the container extending therefrom at one end where the containers are loaded thereon and removed therefrom;

a filling unit disposed in cooperation with the upper run of the container at said end;

a coating unit disposed in cooperation with the lower run of the container at said end;

said conveyor being provided with means for receiving and retaining the containers loaded thereon so that the containers will be held upright as they travel with the upper run and are subjected to the filling unit, but will be held in inverted position as they travel with the lower run and are subjected to said coating unit.

2. Apparatus according to claim 1 in which the freezing tunnel has means for maintaining it at a temperature at least as low as −20° F. and has means for circulating the cold air therein.

3. Apparatus according to claim 1 in which the filling unit includes a nozzle for supplying an edible substance in the upright containers carried by the conveyor and in which said coating unit includes a syrup trough in which the inverted filled containers are dipped.

4. Apparatus according to claim 3 in which an additional unit is provided in cooperation with the lower run of the conveyor beyond the coating unit for applying solid edible particles to the syrup coating, said unit being in the form of a tray for receiving and retaining a supply of the edible particles in which the filled and syrup-coated containers are dipped.

5. Apparatus according to claim 4 in which the tray has a resiliently compressible bottom for supporting the layer of particles.

6. Apparatus according to claim 1 in which the conveyor is provided with longitudinally spaced gripper bar units, each having a row of container-receiving sockets in which the containers are inserted upright, means in cooperation with said sockets for gripping the containers and holding them in the sockets, and actuating means for said gripping means adapted to produce gripping of the container before they pass onto the lower run of the conveyor and for releasing them after they are subjected to said coating unit.

7. Apparatus of the type described comprising an endless conveyor mounted for movement in a vertical plane, longitudinally spaced gripper bar units on the conveyor, each having a row of container-receiving sockets in which the containers are inserted upright as the units move along the upper run of the conveyor, means in cooperation with said sockets for gripping the containers and holding them in the sockets and actuating means for said gripping means adapted to produce gripping of the containers before they pass onto the lower run of the conveyor and for releasing them after they pass onto the lower run of the conveyor.

8. Apparatus according to claim 7 in which said sockets are formed in a bar, a gripper bar mounted in cooperation with the first bar for reciprocation relative thereto and having sockets corresponding to the container-receiving sockets, the second bar having impaling points projecting into each of its sockets for engaging with containers supported in the first sockets.